Patented July 12, 1938

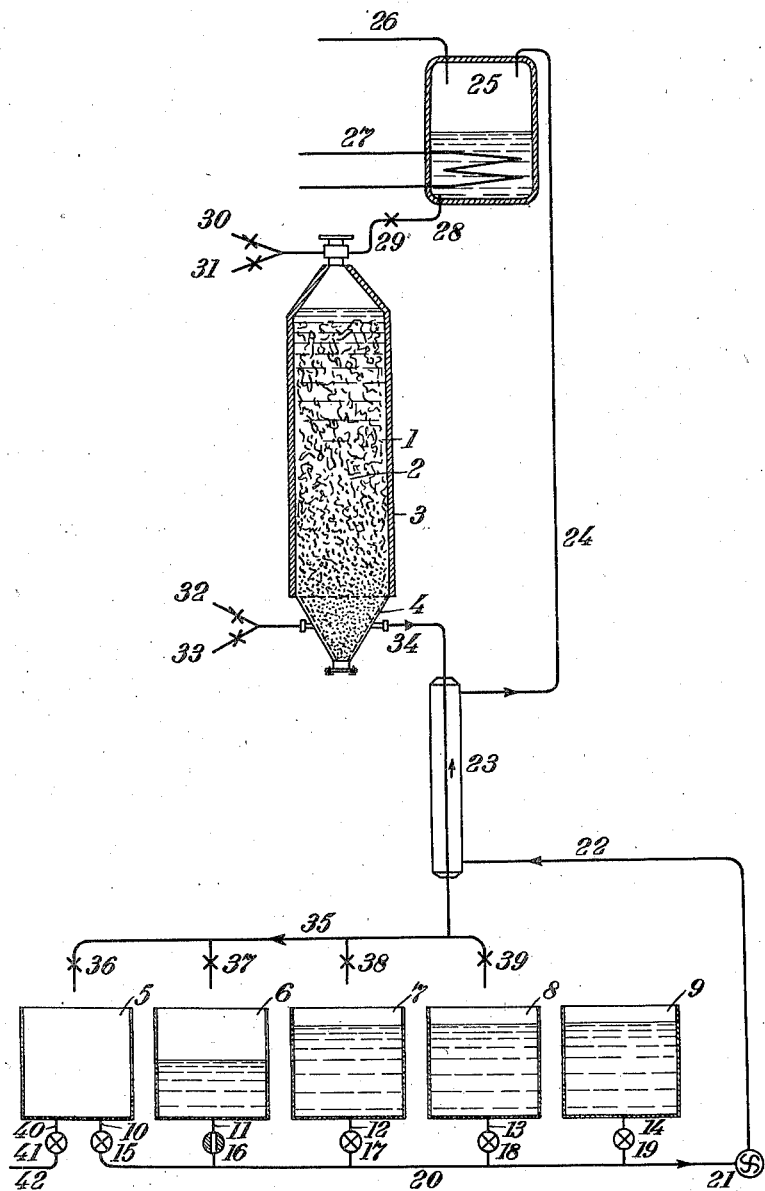

2,123,212

UNITED STATES PATENT OFFICE 2,123,212

PROCESS OF EXTRACTION

Heinrich Scholler, Solln, near Munich, Germany

Application September 24, 1934, Serial No. 745,376
In Germany September 28, 1933

12 Claims. (Cl. 87—28)

This invention relates to a process of and apparatus for the extraction of vegetable materials for the purpose of obtaining the valuable extractives contained therein.

The nature and objects of the invention will become apparent from the following description, appended claims and accompanying drawing wherein the figure shows diagrammatically and partly in section an embodiment of an apparatus for carrying out the instant invention.

In accordance with the principles of the instant invention, the material to be extracted is introduced into an extraction chamber of the type commonly known as percolators. Predetermined batches of an extraction medium are intermittently at predetermined intervals of time introduced into the extraction chamber and caused to flow therethrough. During the course of the process, the successive batches of the extraction medium may be individually smaller than that corresponding to the volume of the substance to be treated. The extraction medium after flowing through the substance within the extractor and containing the extractives is removed under conditions whereby the material being treated is maintained in a moist state, the material being surrounded by vapors.

For the sake of convenience and brevity, the term "vapors" is used throughout to include both vapors and gases, particularly also the vapors of the solvents in question. Since the invention concerns physical processes and not chemical reactions, it will be understood that this terminology is proper and interchangeable.

The process may be utilized for the extraction of any vegetable material. All of the solvents, such as water, benzine, benzene, carbon tetrachloride, trichlorethane, etc. may be used as the extraction mediums.

The preferred materials to be treated are tanning and dye woods as well as resinous and oleiferous substances. With the first two substances, water and water vapor may be used as the extraction medium. When resinous and oleiferous materials are to be treated, the extraction is conducted with an organic solvent employing, if necessary, water vapors or the vapors of the solvents or also inert gases.

The extraction medium, in accordance with the principles of the instant invention, is applied at the top of the percolator. Thus, the extraction medium is able to flow through the material to be extracted in the percolator.

Experiments and research carried on in connection with this process disclosed the surprising fact that the extraction medium penetrates the material more easily and has a better extractive effect if it is of a lower temperature than the material to be extracted. Without restricting myself to any theory, I believe this phenomenon is probably due to the fact that in consequence of its lower temperature the extraction medium is able to condense the vapor present in the interspaces and parts of the material and to penetrate the interspaces themselves. Thus, the invention contemplates utilizing an extraction medium which is of a temperature lower than that of the material to be extracted.

In many cases, particularly with material sensitive to the influence of temperature, it is expedient to operate with decreased pressure and temperatures below 100° C. In such procedures, the extraction medium is drawn into the extraction vessel by the difference in pressure. Also, in this procedure the withdrawal of the extraction medium containing the extractives may also be accomplished by vacuum.

In one embodiment of the invention the process contemplates utilizing temperatures above 100° C., if in view of the conditions such temperatures are admissible.

According to the present invention, extraction and heating under pressure may be utilized simultaneously to constitute a single operation. In such a procedure the extraction medium passes through the material to be extracted during the application of pressure and heat.

In many cases, it is advantageous to maintain the material to be extracted at low temperatures under decreased pressures and thereafter proceeding later to the extraction under pressure. In this manner the first fractions may be removed with great care.

Vacuum extraction and pressure extraction may likewise be combined so as to use excess pressure only when the extraction medium is forced through the material. During the remainder of the procedure, the process may be operated under diminished pressure.

The material, for example oak chips, to be extracted is piled up uniformly and closely in the percolator. It is also desirable that the extraction medium be supplied with such a speed that at first it collects above the material to be extracted in the upper part of the extraction vessel. The liquid extracting medium then travels as much as possible as a compact liquid mass downward through the material until it is withdrawn at the bottom of the percolator.

A special preservative and effective manner of carrying out the process also contemplates modifying or adjusting the temperature in the extraction chamber so that the temperature in the lower part of the extraction chamber is higher than in the upper portion of the extraction chamber. This should always be effected prior to the introduction of the batch of the extraction medium. Such a procedure counteracts the cooling brought about by the introduction of the cooler extraction medium.

The modification or adjustment of temperature just referred to may be effected by introducing steam from below and/or by removing the steam from above. The introduction of steam from below is continued during the introduction of a batch of the extraction medium and until the entire batch is introduced. The steam introduced in the lower portion of the extraction chamber rises and prevents the too easy penetration of the material by the extraction medium, thus avoiding any ineffective or inefficient use of the extracting medium. This same effect can be accomplished by shutting off the introduction of the steam in the upper part of the extraction chamber.

After the entire batch of extraction medium has been introduced into the extraction chamber, the introduction of steam in the lower portion of the extraction chamber is shut off. The batch of extraction medium is then in a compact form lying on the material to be treated. Steam is then introduced at the top whereby the extraction medium is forced through the material to be treated. The downward flow of the extracting medium may also be promoted by withdrawing the steam from the lower part of the extraction chamber. If desired, both operations, i. e. the introduction of steam from above and the removal of steam from below, may be utilized.

In order to render the forcing through of the extraction medium by means of steam especially effective, it is expedient to have the steam introduced in the upper part of the extractor at a pressure considerably higher than that corresponding to the saturated steam pressure of the temperature of the material.

In practical operation, it has been found to be especially advantageous to gradually increase during the process the pressures and also the temperatures of both the extraction medium and the material being treated. When this procedure is utilized, the ratio between the temperatures and the pressure should be maintained.

The process is particularly suitable for use in connection with single extraction chambers. Also, the process may be utilized with a plurality of extraction chambers. When a plurality of extraction chambers are utilized in the process, they may be connected in series or parallel and they should be of corresponding sizes.

The extraction medium containing the extractive may be concentrated in any suitable manner. In the instant process the individual extract portions are separately collected and concentrated by again flowing through extraction chambers. In this procedure the most concentrated solutions are made to act on the freshest material to be extracted and the most exhausted material is treated with fresh extraction medium. To accomplish this, the process contemplates a countercurrent battery or an arrangement of corresponding intermediate vessels which collect and store the solutions having the various degrees of concentration.

Referring now to the drawing wherein like reference numerals designate like parts, the reference numeral 1 designates the extraction vessel (percolator) which is almost completely filled with the material 2 to be treated. The extraction vessel 1 is provided with heat-insulation 3. The cone at the lower portion of the extraction vessel 1 is provided with a filter 4 whereby the liquid free of the solid material may be obtained. At some suitable or convenient place, storage tanks 5, 6, 7 and 8 are provided for the reception of more or less concentrated liquid secured in the manner hereafter explained. A container 9 for fresh water is also provided. These containers 5, 6, 7, 8 and 9 may also be heat-insulated and provided with a heating device, if desired. Each of the containers 5, 6, 7, 8 and 9 is connected by means of piping to the pipe 20 leading to the pump 21. Specifically, the container 5 is provided with a pipe 10 and a valve 15; the container 6 is provided with a pipe 11 and a valve 16; the container 7 is provided with a pipe 12 and a valve 17; the container 8 is provided with a pipe 13 and a valve 18; and the container 9 is provided with a pipe 14 and a valve 19.

The pump 21 is connected by means of a pipe 22 to a heat exchange device 23. The heat exchange device 23 is also connected at any suitable point thereof to an intermediary or batch container 25. The batch container 25 is suitably connected with a steam pipe 26. It may also be provided with an additional heating device of any convenient type and which in the drawing is shown to be a heating coil 27. The purpose of the heating device is to bring the batch of extraction medium in the container 25 to the desired temperature before it is introduced into the extraction vessel. The batch container 25 is also suitably connected by means of a piping 28 to the top of the extraction vessel 1. A valve 29 is provided in the line 28, whereby the flow from the container 25 to the extraction chamber may be obtained, or vice versa.

The upper end of the extraction vessel 1 is connected with a steam pipe 30 and a vacuum pipe 31. Valves are provided in each of these two lines, whereby the introduction of steam or vacuum may be permitted or not as desired.

The lower cone of the extraction chamber is also connected to a steam pipe 32 and a vacuum pipe 33. As in the case of the similar lines connected to the upper portion of the extraction chamber, the lines 32 and 33 are also provided with valves whereby the introduction or cut-off of the material introduced thereby can be secured.

After the extracting medium has passed through the extraction chamber and has enriched itself with extract, it leaves the extraction vessel through the filter 4 and passes by way of the pipe 34 into the heat exchange device 23 and then to the pipe 35 having branches leading to the containers 5, 6, 7 and 8 respectively. Each of the branches is provided with valves designated by reference numerals 36, 37, 38 and 39. By proper adjustment of the valves 36, 37, 38 and 39, the material withdrawn from the extracting chamber will be supplied to the desired storage vessel.

The heat exchange device 23 is of such construction that the material withdrawn from the extraction chamber preheats the extraction medium supplied from the tanks 5, 6, 7, 8 and 9, as the case may be, to the batch container 25. The arrows on the drawing indicate the direction of flow of the extraction medium from the supply tanks to the batch container and also the direction of flow of the material withdrawn from the extraction chamber 1.

The batch tank 25 permits the introduction of predetermined quantities of extraction medium to the extraction chamber. It is independent of the operation of the pump 21. The batch chamber 25 may be supplied with the desired amount of extraction medium by the pump 21, after the extraction medium previously in the batch tank has been supplied to the extraction chamber. If desired, the pump 21 may be of the metering type or the container 25 may be provided with a suitable mechanism for cutting off the operation of the pump when the desired quantity of liquid has been introduced therein.

As indicated above, the process contemplates concentrating the extracts. This is secured in the following manner. When the extraction vessel 1 is filled with the fresh material to be extracted, the storage tank possessing the highest concentration is connected with the pump 21 and this material is supplied to the batch container and thereafter forced through the extraction chamber. Then the extraction liquor containing the next highest concentration is utilized. This procedure is carried on until the extraction medium of the lowest concentration is reached.

Instead of a single extraction vessel, as shown in the drawing, a plurality thereof may be used. Such extraction vessels may be connected in parallel or series.

When the process is carried out utilizing the countercurrent principle, the process may be employed by having the individual liquid batches pass directly without the presence of a storage tank from one extraction vessel to the other.

Each of the vessels 5, 6, 7, 8 and 9 is also provided with a piping system comprising the pipe 40, the valve 41 and the pipe 42 whereby the material in said tanks may be conducted to a suitable collection vessel or storage tank after the process has been completed.

Hereafter there is set forth a specific illustrative example disclosing a practical method in order to more clearly define the nature of the invention.

EXAMPLE FOR OBTAINING TANNING MATTER FROM OAK WOOD

| Time | | | |
|---|---|---|---|
| Hr. Min. | Hr. Min. | | |
| 0 | 00 — 20 | | I Heating |
| | | | Heat to 60° by steaming from below and simultaneous sucking off from above to 0.25 atm. |
| 0 | 20 — 0 | | II Infiltration |
| | | | Introduction of the initial batch into the upper part of the percolator; |
| | | | temperature of batch 45°; |
| | | | the liquid batch is the second fraction of the tan liquor of the preceding operation; |
| | | | pressure above 0.2 atm.; |
| | | | pressure below 0.5 atm.; |
| | | | size of batch per ton of dry wood substance 1 cbm.; |
| 0 | 25 — 30 | | increase pressure above by the supply of steam to 2 atm.; batch flows downwards. |

III
*Percolation*

(1)

| Hr. Min. | Hr. Min. | |
|---|---|---|
| 0 | 30 — 0 35 | Suction above to pressure 0.4 atm.; |
| 0 | 35 — 40 | admission of a batch; temperature of the batch 45°; size of the batch per ton of dry wood substance ½ cbm.; batch liquid: second fraction of preceding operation; simultaneous steaming from below and suction from above; pressure above 0.35 atm.; pressure below 0.6 atm.; |
| 0 | 40 — 45 | steaming from above to 2 atm., batch flows downwards; |
| 0 | 45 — 50 | bath flows out of the percolator; the batch liquid is separated as the first fraction; temperature of the flowing-off batch: 60–65°. |

(2)

There is now a repetition of the operations as under III/(1) in the same chronological order;

| | | |
|---|---|---|
| 0 | 50 — 55 | suction from above to pressure 0.4 atm.; |
| 0 | 55 — 00 | admission of a batch; temperature of batch: 45°; size of batch: per ton of dry wood substance: ½ cbm.; batch liquid: second fraction of the preceding operation; simultaneous steaming from below and suction from above; pressure above: 0.35 atm., pressure below: 0.6 atm., |
| 1 | 00 — 05 | steaming from above to 2 atm., batch flows down; |
| 1 | 05 — 10 | batch flows off, separated as first fraction; temperature 60–65°. |

(3)

Repetition of the operations as under III/(1)

| | | |
|---|---|---|
| 1 | 10 — 15 | Suction above to pressure 0.4 atm.; |
| 1 | 15 — 20 | admission of a batch; temperature of batch: 45°; size of batch: ½ cbm. per ton of dry wood substance; batch liquid: 2nd fraction of preceding operation; |

| Hr. | Min. | Hr. | Min. | | Hr. | Min. | Hr. | Min. | |
|---|---|---|---|---|---|---|---|---|---|
| | | | | simultaneous steaming from below and suction from above; pressure above: 0.35 atm.; pressure below: 0.6 atm.; | 2 | 15 | — | 20 | admission of a batch; temperature of a batch: 55°; size of batch: ½ cbm. per ton of dry wood substance; batch liquid: 3rd fraction from preceding operation; simultaneous steaming from below and evacuating from above; pressure above: 0.55 atm.; pressure below: 0.8 atm.; |
| 1 | 20 | — | 25 | steaming from above to 2 atm.; batch flows down; | | | | | |
| 1 | 25 | — | 30 | flowing-off of the batch, separated for 1st fraction; temperature: 65–70°. | | | | | |
| | | | | (4) | 2 | 20 | — | 25 | steaming from above up to 2 atm.; batch flows down; |
| | | | | Repetition of the operations as under III/(1) | 2 | 25 | — | 30 | flowing-off of the batch; separated to 2nd fraction; temperature: 75–80°. |
| 1 | 30 | — | 35 | suction above to pressure 0.5 atm.; | | | | | |
| 1 | 35 | — | 40 | admission of a batch; batch temperature 50°; size of batch: ½ cbm. per ton of dry wood substance; batch liquid: 3rd fraction of preceding operation; simultaneous steaming from below and suction from above; pressure above: 0.45 atm.; pressure below: 0.7 atm.; | | | | | (7) |
| | | | | | | | | | Repetition of the operations as under III/(1) |
| | | | | | 2 | 30 | — | 35 | suction above up to pressure 0.6 atm.; |
| | | | | | 2 | 35 | — | 40 | admission of a batch; temperature of batch: 55°; size of batch: ½ cbm. per ton of dry wood substance; batch liquid: 3rd fraction of preceding operation; simultaneous steaming from below and suction from above; pressure above: 0.55 atm.; pressure below: 0.8 atm.; |
| 1 | 40 | — | 45 | steaming from above to 2 atm.; batch flows down; | | | | | |
| 1 | 45 | — | 50 | flowing-off of batch, separated to fraction II; temperature: 70–75°. | | | | | |
| | | | | (5) | 2 | 40 | — | 45 | steaming from above up to 2 atm.; batch flows down; |
| | | | | Repetition of the operations as under III/(1) | 2 | 45 | — | 50 | flowing-off of the batch, separated to 2nd fraction; temperature: 80–85°. |
| 1 | 50 | — | 55 | suction above up to pressure 0.5 atm.; | | | | | |
| 1 | 55 | —2 | | admission of a batch; temperature of batch: 50°; size of batch: ½ cbm. per ton of dry wood substance; batch liquid: 3rd fraction of preceding operation; simultaneous steaming from below and suction from above; pressure above: 0.45 atm.; pressure below: 0.7 atm.; | | | | | (8) |
| | | | | | | | | | Repetition of the operations as under III/(1) |
| | | | | | 2 | 50 | — | 55 | suction above up to pressure 0.65 atm.; |
| | | | | | 2 | 55 | —3 | | admission of a batch; batch temperature: 60°; size of batch: ½ cbm. per ton of dry wood substance; batch liquid: 4th fraction of preceding operation; simultaneous steaming from below and evacuating from above; pressure above: 0.6 atm.; pressure below: 0.9 atm.; |
| 2 | 00 | — | 05 | steaming from above up to 2 atm.; batch flows down; | | | | | |
| 2 | 05 | — | 10 | flowing-off of the batch; separated to 2nd fraction; temperature: 75–80°. | | | | | |
| | | | | (6) | 3 | 00 | — | 05 | steaming from above up to 2 atm.; batch flows down; |
| | | | | Repetition of the operations as under III/(1) | 3 | 05 | — | 10 | flowing-off of the batch; separated to 2nd fraction; temperature: 80–85°. |
| 2 | 10 | — | 15 | suction above up to pressure 0.6 atm.; | | | | | |

(9)

Repetition of the operations as under III/(1)

Hr. Min. Hr. Min.
3  10 — 15
3  15 — 20 suction above up to pressure 0.7 atm.;

admission of a batch;
batch temperature: 65°;
size of batch: ½ cbm. per ton of dry wood substance;
batch liquid: 4th fraction from preceding operation;
simultaneous steaming from below and evacuating from above;
pressure above: 0.65 atm.;
pressure below: 0.9 atm.;

3  20 — 25 steaming from above up to 2 atm.; batch flows down;

3  25 — 30 flowing-off of batch; separated to 3rd fraction;
temperature: 85–90°.

(10)

Repetition of the operations as under III/(1)

3  30 — 35
3  35 — 40 suction above up to pressure 0.75 atm.;

admission of a batch;
batch temperature: 65°;
size of batch: ½ cbm. per ton of dry wood substance;
batch liquid: 4th fraction from preceding operation;
simultaneous steaming from below and evacuating from above;
pressure above: 0.7 atm.;
pressure below: 1.0 atm.;

3  40 — 45 steaming from above up to 2 atm.; batch flows down;

3  45 — 50 flowing-off of batch; separated to 3rd fraction;
temperature: 85–90°.

(11)

Repetition of the operations as under III/(1)

3  50 — 55
3  55 — 00
3  —4 admission of a batch;
batch temperature: 70°;
size of batch: ½ cbm. per ton of dry wood substance;
batch liquid: 4th fraction of preceding operation;
simultaneous steaming from below and evacuating from above;
pressure above: 0.75 atm.;
pressure below: 1.0 atm.;

Hr. Min. Hr. Min.
4  00 — 05
4  05 — 10 steaming from above up to 2 atm.; batch flows down;

flowing-off of batch; separated to 3rd fraction;
temperature: 90–95°.

(12)

Repetition of the operations as under III/(1)

4  10 — 15
4  15 — 20 suction above up to pressure 0.90 atm.;

admission of a batch;
batch temperature: 75°;
size of batch: ½ cbm. per ton of dry wood substance;
batch liquid: water;
simultaneous steaming from below and evacuating from above;
pressure above: 0.8 atm.;
pressure below: 1.1 atm.;

4  20 — 25
4  25 — 30 steaming from above up to 2 atm.; batch flows down;

flowing-off of batch; separated to 3rd fraction;
temperature: 90–95°.

(13)

Repetition of the operations as under III/(1)

4  30 — 35
4  35 — 40 suction above up to pressure 1.0 atm.;

admission of a batch;
batch temperature: 80°;
size of batch: ½ cbm. per ton of dry wood substance;
batch liquid: water;
simultaneous steaming from below and evacuating from above;
pressure above: 0.95 atm.;
pressure below: 1.3 atm.;

4  40 — 45
4  45 — 50 steaming from above up to 2 atm.; batch flows down;

flowing-off of batch; separated to 4th fraction;
temperature: 95–98°.

(14)

Repetition of the operations as under III/(1)

4  50 — 55
4  55 — 00
4  —5 suction above up to pressure 1.1 atm.;

admission of a batch;
batch temperature: 80°;
size of batch: ½ cbm. of dry wood substance;
batch liquid: water;
simultaneous steaming from below and evacuating from above;

| Hr. Min. | Hr. Min. | |
|---|---|---|
| | | pressure above: 1.0 atm.; pressure below: 1.3 atm.; |
| | 00 — 05 | steaming from above up to 2 atm.; batch flows down; |
| | 05 — 10 | flowing-off of batch; separated to 4th fraction; temperature: 98°. |

(15)

Repetition of the operations as under III/(1)

| Hr. Min. | |
|---|---|
| 10 — 15 | suction above up to pressure 1.1 atm.; |
| 15 — 20 | admission of a batch; batch temperature: 80°; size of batch: ½ cbm. per ton of dry wood substance; batch liquid: water; simultaneous steaming from below and evacuating from above; pressure above: 1.0 atm.; pressure below: 1.3 atm.; |
| 20 — 25 | steaming from above up to 2 atm.; batch flows down; |
| 25 — 30 | flowing-off of the batch, separated to 4th fraction; temperature: 98°. |

(16)

Repetition of the operations as as under III/(1)

| Hr. Min. | |
|---|---|
| 30 — 35 | suction above up to pressure 1.1 atm.; |
| 35 — 40 | admission of a batch; batch temperature: 80°; size of batch: ½ cbm. per ton of dry wood substance; batch liquid: water; simultaneous steaming from below and evacuating from above; pressure above: 1.1 atm.; pressure below: 1.4 atm.; |
| 40 — 45 | steaming from above up to 2 atm.; batch flows down; |
| 45 — 50 | flowing-off of batch; separated to 4th fraction; temperature: 98°. |

When working in accordance with the example the following concentrations are obtained:

| | Per cent |
|---|---|
| Fraction 1 _____ tanning matter__ | 2.8 |
| Fraction 2 _____ do____ | 1.9 |
| Fraction 3 _____ do____ | 1.1 |
| Fraction 4 _____ do____ | 0.5 |

Only Fraction 1 is conveyed to the clearing and evaporating station, Fractions 2, 3 and 4 being used for the additional enriching of the liquor. Consequently, only a concentration of 2.8% of tanning matter is worked up.

The process possesses many advantages. It permits the operations to be carried on in a single extraction chamber. This is of special importance, if it is intended to utilize the residue in the extraction chamber for some other purpose. The instant process also produces higher degrees of concentration than have heretobefore been obtained in the tanning matter industry. When oak wood is used, the tanning matter content of the crude extract, when it is worked up, amounts to 2.8%, while heretofore in the tanning matter industry the yield has been concentrations of 1.5 to 2%. In the instant process, the time of extraction has been very considerably shortened by reason of the alternate action of liquid and steam and the comparatively rapid passing of the liquid through the material to be extracted. In consequence, extract of particularly good quality is obtained.

In the processes used prior to this invention, the commercial products contained 45–50 parts of non-tanning matter for each 100 parts of tanning matter. The product of the instant invention contains approximately only 20–25 parts of non-tanning matter for each 100 parts of tanning matter. Higher or lower yields may be obtained in accordance with the length of time during which the extraction is continued. The specific example hereinbefore set forth yielded 75% of the tanning matter in the oak wood as tanning matter extract.

Since it is obvious that various changes and modifications may be made in the above description without departing from the nature or spirit thereof, this invention is not restricted thereto except as set forth in the appended claims.

I claim:

1. A process for the extraction of vegetable material comprising intermittently and rapidly flowing individual batches of an extraction medium through vegetable material in an extractor, each successive batch of extraction medium being smaller than that corresponding to the volume of the vegetable material being treated and the temperature thereof being lower than that of the vegetable material, withdrawing the medium containing the extractives substantially immediately after the percolation of the vegetable material, and leaving the vegetable material after each batch of extraction medium has flowed therethrough in a moist state surrounded by gases and vapors.

2. A process for the extraction of vegetable material comprising intermittently and rapidly flowing individual batches of an extraction medium through vegetable material in an extractor, each successive batch of extraction medium being smaller than that corresponding to the volume of the vegetable material being treated and the temperature thereof being lower than that of the vegetable material, withdrawing the medium containing the extractives substantially immediately after the percolation of the vegetable material, leaving the vegetable material after each batch of extraction medium has flowed therethrough in a moist state surrounded by gases and vapors, and increasing the pressure within the extractor.

3. A process for the extraction of vegetable material comprising intermittently and rapidly flowing individual batches of an extraction medium through vegetable material in an extractor, the pressure at the top of the extractor being less than the pressure at the lower part of the extractor and the temperature of the extraction medium being lower than that of the vegetable material, causing the extraction medium to flow through said vegetable material, withdrawing the medium containing the extractives, leaving the vegetable material after each batch of extraction medium has flowed therethrough in a moist state surrounded by gases and vapors, and successively increasing both of said pressures proportionately within the extractor prior to the introduction of the next batch into the extractor.

4. A process for the extraction of vegetable material comprising modifying the temperature within the extractor so that the vegetable material in the lower portion of the extractor is at a higher temperature than the vegetable material at the upper part of the extractor, intermittently and rapidly flowing individual batches of an extraction medium through vegetable material in an extractor, each successive batch of extraction medium being smaller than that corresponding to the volume of the vegetable material being treated and the temperature thereof being lower than that of the vegetable material, withdrawing the extraction medium containing the extractives, and leaving the vegetable material after each batch of extraction medium has flowed therethrough in a moist state surrounded by gases and vapors.

5. A process for the extraction of vegetable material comprising modifying the temperature within the extractor so that the vegetable material in the lower portion of the extractor is at a higher temperature than the vegetable material at the upper part of the extractor, intermittently and rapidly flowing individual batches of an extraction medium through vegetable material in an extractor, the temperature of the extraction medium being lower than that of the vegetable material, withdrawing the extraction medium containing the extractives, and leaving the vegetable material after each batch of extraction medium has flowed therethrough in a moist state surrounded by gases and vapors.

6. A process for the extraction of vegetable material comprising intermittently and rapidly flowing individual batches of an extraction medium through vegetable material in an extractor, inhibiting the flow of each batch of extraction medium through the vegetable material until the entire batch thereof has been introduced in the extractor and collected on top of the vegetable material, withdrawing the medium containing the extractives, and leaving the vegetable material after each batch of extraction medium has flowed therethrough in a moist state surrounded by gases and vapors.

7. A process for the extraction of vegetable material comprising intermittently and rapidly flowing individual batches of an extraction medium through vegetable material in an extractor, the temperature of the extraction medium being lower than that of the vegetable material, inhibiting the flow of each batch of extraction medium through the vegetable material until the entire batch thereof has been introduced in the extractor and collected on top of the vegetable material, withdrawing the medium containing the extractives, and leaving the vegetable material after each batch of extraction medium has flowed therethrough in a moist state surrounded by gases and vapors.

8. A process for the extraction of vegetable material comprising intermittently and rapidly flowing individual batches of an extraction medium through vegetable material in an extractor, the temperature of the extraction medium being lower than the temperature of the vegetable material, inhibiting the flow of the extraction medium through the vegetable material until the entire batch thereof has been introduced and collected on top of the vegetable material, introducing steam at a pressure higher than that within the extractor to facilitate the flow of the extraction medium through the vegetable material, withdrawing the medium containing the extractives, and leaving the vegetable material after each batch of extraction medium has flowed therethrough in a moist state surrounded by gases and vapors.

9. A process for the extraction of vegetable material comprising modifying the temperature within the extractor so that the vegetable material in the lower portion of the extractor is at a higher temperature than the vegetable material at the upper part of the extractor, intermittently and rapidly flowing individual batches of an extraction medium through vegetable material in an extractor, the temperature of the extraction medium being lower than that of the vegetable material, inhibiting the flow of the extraction medium through the vegetable material until the entire batch thereof has been introduced and collected on top of the vegetable material, introducing steam at a pressure higher than that within the extractor to facilitate the flow of the extraction medium through the vegetable material, withdrawing the medium containing the extractives, and leaving the vegetable material after each batch of extraction medium has flowed therethrough in a moist state surrounded by gases and vapors.

10. A process for the extraction of vegetable material comprising intermittently and rapidly flowing individual batches of an extraction medium through vegetable material in an extractor, the temperature of the extraction medium being lower than that of the vegetable material, increasing the pressures on and temperatures of the extraction medium and the vegetable material in the same proportions, withdrawing the medium containing the extractives, and leaving the vegetable material after each batch of extraction medium has flowed therethrough in a moist state surrounded by gases and vapors.

11. A process for the extraction of vegetable material comprising intermittently and rapidly flowing individual batches of an extraction medium through vegetable material in an extractor, each succesive batch of extraction medium being smaller than that corresponding to the volume of the vegetable material being treated and the temperature thereof being lower than that of the vegetable material, introducing steam at a pressure higher than that within the extractor to facilitate the flow of the extraction medium through the vegetable material, increasing the pressures on and temperatures of the extraction medium and the vegetable material in the same proportions, withdrawing the medium containing the extractives, and leaving the vegetable material after each batch of extraction medium has flowed therethrough in a moist state surrounded by gases and vapors.

12. A process for the extraction of vegetable material comprising intermittently and rapidly flowing individual batches of an extraction medium through vegetable material in an extractor, the temperature of the extraction medium being lower than that of the vegetable material, introducing steam at a pressure higher than that within the extractor to facilitate the flow of the extraction medium through the vegetable material, increasing the pressures and temperatures of the extraction medium and the vegetable material in the same proportions, withdrawing the medium containing the extractives, and leaving the vegetable material after each batch of extraction medium has flowed therethrough in a moist state surrounded by gases and vapors.

HEINRICH SCHOLLER.